Feb. 5, 1929.
C. O. McBRIDE
TRIM MOLDING
Original Filed May 8, 1923
1,701,415
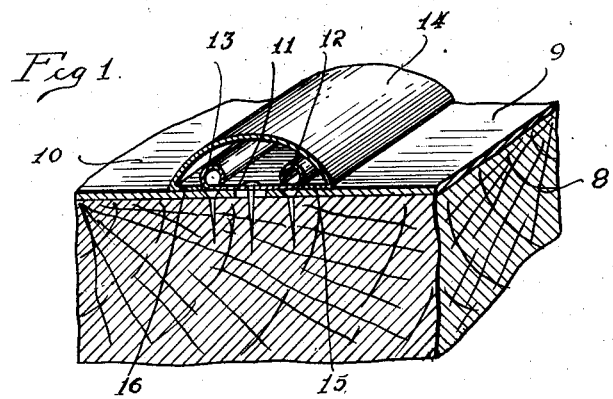
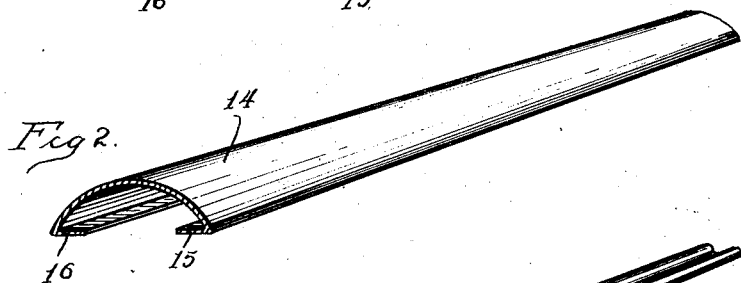
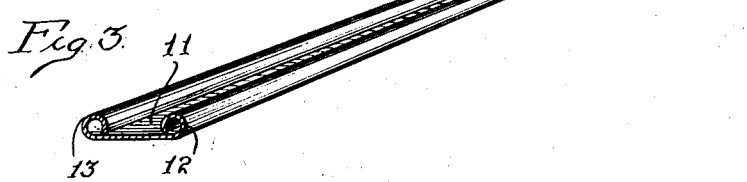
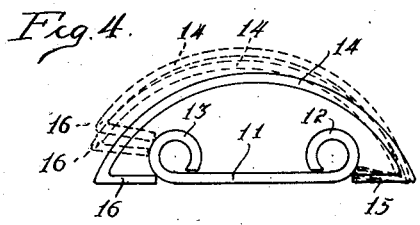
INVENTOR.
Clarence O. McBride
BY
ATTORNEY.

Patented Feb. 5, 1929.

1,701,415

UNITED STATES PATENT OFFICE.

CLARENCE O. McBRIDE, OF DETROIT, MICHIGAN, ASSIGNOR TO BRIGGS MANUFACTURING COMPANY, OF DETROIT, MICHIGAN, A CORPORATION OF MICHIGAN.

TRIM MOLDING.

Original application filed May 8, 1923, Serial No. 637,585. Divided and this application filed February 11, 1926. Serial No. 87,521.

The present invention which is divided out of a previous application for a patent on a trim molding, filed by me on May 8th, 1923, Serial No. 637,585, relates to a molding used for concealing the fastening means of trimming, panels and other parts having meeting or fastened edges.

I am aware that other devices have been arranged and constructed for securing the molding to the supporting body in such a manner that the securing means are concealed. The present invention, however, has certain features which impart to it advantages over known structures. It is desirable that the molding rest firmly in engagement with the supporting surface upon which mounted so as to press tightly against the surface to retain panels or other separate parts in a position of firm mounting.

It is also desirable that the molding itself be free from excessive vibration or rattling and it is an object of the present invention to provide a molding with attaching means whereby these advantages may be attained and in which the necessary features may be incorporated.

Another object of the present invention is the provision of a molding having attaching means co-operating with the molding for preventing any rattling regardless of the jarring loose or vibration of the attaching means.

Other objects will appear hereinafter.

The invention consists in the combination and arrangement of parts hereinafter described and claimed.

The invention will be best understood from a reference to the accompanying drawings, which form a part of this specification and in which, Fig. 1 is a perspective view of a section of molding embodying the invention showing the end of the invention in perspective cross section.

Fig. 2 is a perspective view of the molding.

Fig. 3 is a perspective view of the attaching member of the invention.

Fig. 4 is a diagrammatic view illustrating the operation of the invention.

In Fig. 1 I have shown mounted upon the supporting body 8 a pair of adjacent panels 9 and 10. The invention is adapted for use in covering the meeting edges of these panels which are tacked or otherwise suitably secured to the supporting body 8. To this end I have provided a strip of metal 11 which has its edges curled to form cylindrical bodies 12 and 13, the molding itself comprises a strip of trough-shaped metal formed arcuate and has its edges 15 and 16 turned inwardly, as clearly appears in Fig. 1. The strip 11 is secured to the supporting body 8 by nails 17 or in any other suitable manner so that this strip 11 will overlie the space between the edges of the panels 9 and 10 and cover their edges. In order to conceal the fastening of the strip 11 the molding 14 is clamped over the cylindrical curled portions 12 and 13. This is done by snapping the molding strip 14 over the cylindrical bodies 12 and 13, the inturned edges 15 and 16 of the molding strip 14 springing apart to permit the snapping of these edges in locking position on the cylindrical bodies 12 and 13.

It is evident that when the edges 15 and 16 are passing the center of the cylindrical bodies 12 and 13 that the springing apart of the edges 15 and 16 is at the maximum so that when moved below the center of the cylindrical bodies 12 and 13 the inturned edges or flanges 15 and 16 tend in response to the resiliency of the metal from which the molding 14 is constructed to move downwardly on the cylindrical bodies 12 and 13 and inwardly toward each other. On this account the flanges or inturned edges 15 and 16 are held by the resiliency of the molding 14 in close engagement with the panels 9 and 10, thus serving to retain the panels in close engagement with the supporting body 8. In normal position when the flanges of the inturned edges 15 and 16 are lying in close engagement with the panels 9 and 10, the inturned edges of the flanges 15 and 16 are still sprung slightly apart out of their normal position, so that there is a tendency of the inturned edges or flanges 15 and 16 to move inwardly under the cylindrical bodies 12 and 13. This assures a tight gripping of the mounting on the cylindrical bodies 12 and 13 and further assures a close binding of these parts even should the strip 11, through becoming loose on its mountings or the body 8 be lifted from or jarred slightly loose of the supporting body 8. In this connection it will be noted that there is an inward pressure of the inturned edges on a surface which extends angularly to the body 8, this surface being the periphery of the cylindrical portions 12 and 13 so that the inward pressing of the flanges or inwardly directed edges 15 and 16 is directed against an arcuate body for effecting or at least tending to effect an approach of the molding to the supporting body 8.

It is thus seen that the device serves to bind the paneling into close engagement with the supporting body 8 and that the device automatically locks itself against the held body or panel while at the same time it adjusts itself in its engagement with the panel or held body depending upon the retaining strip having the cylindrical bodies 12 and 13.

While I have illustrated and described the preferred form of structure, I do not wish to limit myself to the precise form of structure shown, but desire to avail myself of such variations and modifications as come within the scope of the appended claims.

Having thus described my invention what I claim as new and desire to secure by Letters Patent is:

1. A trim molding of the class described, comprising: a fastening strip adapted for mounting on a supporting surface and having its longitudinal edges curled to form arcuate bearing surfaces; a trough shaped molding having its edges turned inwardly toward each other and providing planar bodies lying in the same plane, said molding being adapted for snapping over said arcuate bearing surfaces, the edges of said planar bodies engaging against said supporting surface in response to the resiliency of the material from which said molding is made, said planar bodies being normally, while mounted on said fastening strip, retained beyond normal separation, the resistance of said arcuate bearing surface to the relative inward movement of the edges of said planar bodies being dependent upon the relative location of said bearing surface and said supporting surface, said arcuate bearing surfaces being normally free from engagement with the main body of said molding.

2. A trim molding of the class described, comprising: a fastening strip adapted for mounting on a supporting surface and having its longithdinal edges curled to form arcuate bearing surfaces; a trough-shaped molding having its edges turned inwardly toward each other and providing planar bodies, said molding being adapted for snapping over said arcuate bearing surfaces, the edges of said planar bodies engaging said supporting surface in response to the resiliency of the material from which said molding is made, said planar bodies being normally, while mounted on said fastening strip, retained beyond normal separation, the resistance of said arcuate bearing surface to the relative inward movement of the edges of said planar bodies being dependent upon the relative location of said bearing surface and said supporting surface, said arcuate bearing surfaces being normally free from engagement with the main body of said molding.

In testimony whereof I have signed the foregoing.

CLARENCE O. McBRIDE.